July 8, 1941.  R. ADDY ET AL  2,248,047
TIRE SIGNAL AND SYSTEM
Filed Oct. 12, 1939
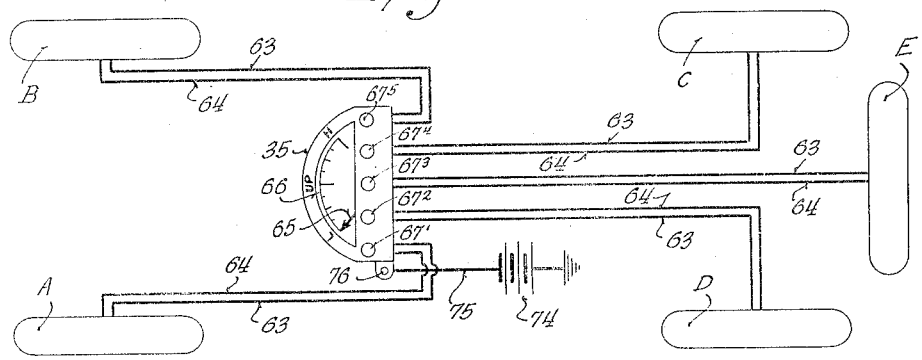
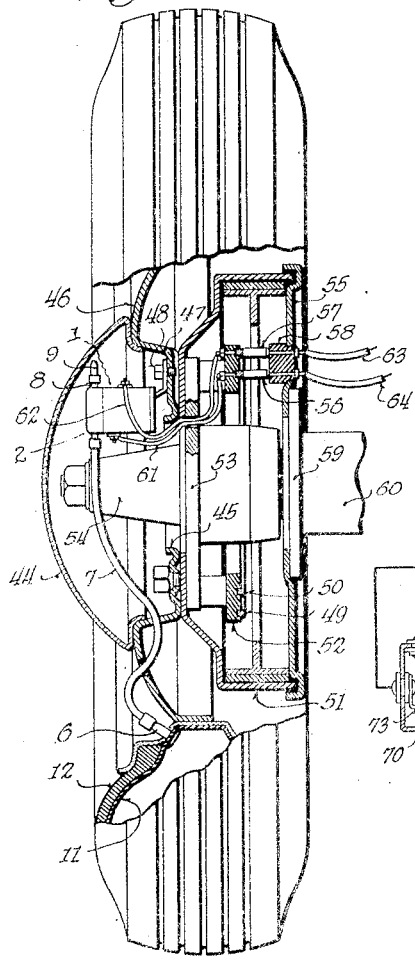
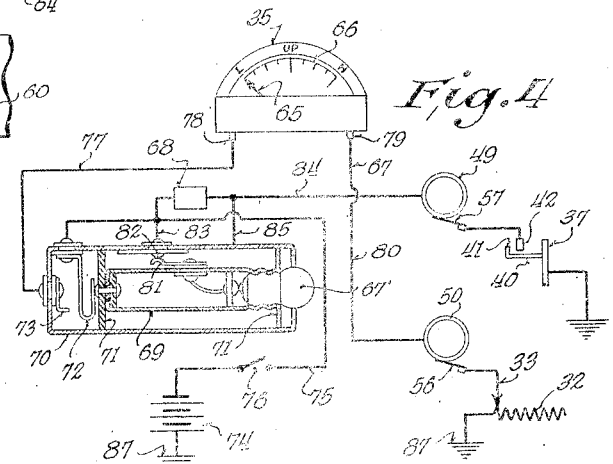
INVENTORS
ROY ADDY
HENRY E. ADDY
BY
ATTORNEY.

Patented July 8, 1941

2,248,047

UNITED STATES PATENT OFFICE 2,248,047

TIRE SIGNAL AND SYSTEM

Roy Addy and Henry E. Addy, Milwaukee, Wis.

Application October 12, 1939, Serial No. 299,053

5 Claims. (Cl. 201—48)

This invention relates to improvements in respect to automatically operating pressure signaling systems for the pneumatic tires on automobiles and other motor vehicles.

The principal purpose and object of our invention is to provide a tire signaling system which is not only simple in construction and operation, but which may be readily and easily applied to automobiles or other vehicles already in use or as standard equipment.

A further object of our invention is to provide a signaling system in which the pressure responsive devices are in unit form and are mountable on the wheel structures of the respective wheels of the vehicle.

A further object of our invention is to provide pressure responsive devices which are not only compact and simple in construction, but are of a size adapting them to fit within the space between the wheel body and its removable hub cup.

A further object of our invention is to have the pressure responsive element of each unit in the form of a diaphragm of resilient material such as rubber and which diaphragm is constructed to have alined tubular portions on opposite sides of a radial portion which enables the diaphragm to be clamped in place between the base and the outer casing members which mount and house the diaphragm.

The further object of our invention is to provide in connection with the diaphragm a spring biased plunger, the acting pressure of which may be readily and easily adjusted to the selected operative pressure for the vehicle tire.

A further object of our invention is to provide the system with a set of electric lamps, one for each wheel, and a gauge common to all of the lamps for indicating the pressure condition within the tires whenever the gauge is connected into the electric circuit with a lamp.

A further object of our invention is to associate the switch means for the gauge with the lamps and have each lamp slidably mounted so that the switch for the gauge may be actuated by pressing inward on the selected lamp.

The invention consists further in the features hereinafter described and claimed.

In the accompanying drawing—

Fig. 1 is a diagrammatic view illustrating the application of our invention to a motor vehicle;

Fig. 2 shows a pressure responsive device of our invention in its application to one of the wheels of the vehicle, the view being broken away and in section respectively;

Fig. 3 shows said pressure responsive device in longitudinal section; and

Fig. 4 is a wiring diagram to be hereinafter described.

As shown in Fig. 3, the pressure responsive device of our invention comprises a cylindrical outer casing 1 and a base member 2. These elements are secured together in longitudinal alinement, there being a screw threaded connection between them at their meeting ends as shown. The member 2 is provided with a pressure chamber 3 and a pair of passages 4, 5 extending through the member 2 and connected into the chamber adjacent the bottom thereof. One passage, for example, the passage 5, is connected with the inflating stem of the associated pneumatic tire. In Fig. 2, the stem is indicated at 6 and the rubber or other flexible tube which connects the passage 5 with said stem is marked 7.

The other passage 4 extends through a boss 8 on the member 2 and said boss provides a mounting for an inflating valve fixture 9 through which the associated tire may be inflated in the usual manner. The member 2 is also provided with a boss 10 for the passage 5 and said boss is screw threaded so that the conduit 7 may be connected thereto as shown.

From the foregoing, it is apparent, that the inner tube of the tire with which the device 1—2 is associated is inflated through the chamber 3 in the member 2 and hence the pressure in said chamber is the same as within the inner tube of the tire. The inner tube is shown at 11 in Fig. 2, while the tire casing is marked 12.

The outer casing 1 is provided with a chamber 13 which registers with the chamber 3 when the parts are assembled as shown in Fig. 3. The chamber 13 is formed by a tubular protection 14 on the bottom wall 15 of the casing 1. The chambers 3 and 13 are preferably of the same diameter so that the two provide in effect a continuous chamber, one portion of which is within the member 2 and the other portion is within the casing 1. Located within this combined chamber is a flexible rubber diaphragm 16 having oppositely extending tubular portions 17, 18 of approximately the same diameter. The portions 17, 18 fit within their respective chambers 3 and 13 and engage against the cylindric walls thereof. The portions 17 and 18 are integrally connected in respect to each other and also in respect to an exterior radial flange section 19 by means of which the portions 17, 18 are held in place within the chambers 3 and 13. The flange 19 is annular and is clamped between the casing 1 and the member 2 when such parts are secured together. The member 2 has a flat surface 20 to seat the flange 19 of the diaphragm.

The tubular portions 17 and 18 open into the chamber 3 and hence the air pressure in said chamber finds entry into the tubular portions to press them against the chamber walls on opposite sides of the flange 19. This has the dual purpose of preventing air leakage out of the chambers 3 and 13 at the flange 19 and to support the end thrust of a plunger (to be presently referred to) on the tubular portion 18 at its end wall 21. The latter is integral with the outer end of the tubular portion 18 and provides a closure therefor as shown.

The plunger referred to is located within the outer casing 1 and extends through an opening in the end wall 22 of the projection 14 to reach the rubber element 16. The plunger is marked 23 and is spring biased against the end wall 21 of said rubber member in opposition to the air pressure within the chamber 3. As this air pressure reduces, the plunger 23 moves the wall member 21 further inward by reason of the flexible nature of the member 16. As the wall section 21 moves into the tubular portion 18, the rubber structure doubles on itself as shown in Fig. 3.

The spring which moves the plunger inward is marked 24 and is housed within the plunger, the latter being made hollow as shown. The inner end of the spring 24 seats against the bottom wall of the plunger, that is, the plunger wall which rests on the diaphragm wall 21, while the outer end of the spring bears against a nut 25 on a screw threaded rod 26. Said rod extends axially of the plunger and has its outer end projecting through a closure plate 27 at the outer end of the casing 1. This plate may have a screw threaded connection with the casing as shown.

The outer end of the rod 26 may be slotted or otherwise formed to receive a tool for turning the rod to adjust the tension of the spring 24 through the nut 25. The rod is provided with a rigid collar 28 which is pressed by the spring against the inner side of the plate 27 to hold the rod in place. The nut 25 is prevented from turning by having a pin 29 on the nut extending into an axially extending slot 30 in the plunger 23. The latter has a similar connection with the outer casing 1 to hold the plunger from rotation.

The plunger 23 carries a spool element 31 within the outer casing 1. Said spool is of electrical insulation material and provides a mounting for a coil of electrical resistance wire 32. This coil is about the outer periphery of the spool and is engaged by a spring contact finger 33 fixed within the outer casing 1 by a terminal 34 as shown in Fig. 3. The finger 33 slides over the coil in the endwise movement of the plunger and controls the amount of current flow through the coil to indicate at a gauge 35 the pressure condition within the associated vehicle tire. The coil 32 is grounded through the plunger 23 by a lead 36.

The plunger 23 is provided at its outer end with a disc-like element 37 having a peripheral projection 38 riding in an axially extending slot 39 in the outer casing 1. This holds the plunger against turning, the disc 37 having a rigid connection with the plunger. The disc 37 carries an axially extending rod-like element 40 located in the space between the coil 32 and the adjacent outer wall of the casing 1. The element 40 is provided with a stop 41 at its inner end to contact with a terminal 42 fixed to the outer casing 1 and in an electrical circuit with a lamp and a sounder, respectively. The purpose of this stop is to sound an alarm when the tire is over inflated. When the plate 37 contacts the terminal 42, the alarm is sounded to indicate an under inflation. The spool 31 is cored out at its inner end as indicated at 43 to accommodate the projection 14 when the plunger moves towards the projection. This contributes to the compactness of the device in an axial direction.

The pressure responsive device 1—2 is mounted on the wheel of the vehicle beneath the hub cap 44 as shown in Fig. 2. This encloses the device within the wheel structure and protects it. The device is mounted on the hub section 45 of the wheel structure 46 by a bracket 47. The latter is preferably carried by the closure plate 27 of the device and is secured to the hub section of the wheel structure by one or more bolts or screws 48. The pressure responsive device is preferably mounted in place with its inflating valve fixture 9 readily accessible on taking off the hub cap. In keeping with this object, the device 1—2 is located on the outer side of the wheel structure 46 as shown herein.

A pair of conductor rings 49, 50 are located within the brake drum housing 51 of the wheel, said rings being secured to an insulation annulus 52 rotating with the wheel on its axle part 53. The latter is on the front or outer side of the brake drum assembly and mounts the brake drum casing 51 as shown. The axle is marked 54. The rear cover plate 55 of the brake drum assembly carries a pair of brushes 56, 57 which press against the respective conductor rings 49, 50. These brushes have resilient contact with the rings and are carried by an insulation block 58 secured to the brake drum cover. The latter is non-rotative, being secured to the adjacent stationary flange 59 of the axle housing 60. The terminals 34 and 42 of the unit 1—2 are respectively connected to the rings 49, 50 by the electrical conducting wires 61 and 62, respectively, as shown in Fig. 2. The brushes 56, 57 are connected with wires 63, 64.

The gauge device 35 is provided with a movable pointer 65 for the scale 66 and five incandescent lamps $67^1$ to $67^5$ inclusive. The scale 66 is calibrated to indicate under and over pressures. When the tire is at its selected operative pressure, the pointer will move to the "up" position on the scale on closing the gauge switch. This is brought about by adjusting the tension on the springs 24 of the several units 1—2 to accord with the selected operative tire pressure. When the latter reduces, the pointer will fall short of the "up" position when the switch is closed. Whereas, in case of an increase in pressure the pointer will move beyond the "up" position.

The lamps are in circuit with the respective pressure responsive units 1—2 secured to the four traction wheels A to D inclusive and the spare tire E of the motor vehicle as shown in Fig. 1. It is to be understood that there is a pressure responsive device 1—2 applied to each of these wheels and further that only the traction wheels are equipped with the conductor ring and brush assemblies detailed in Fig. 2. For the spare tire, a direct connection is used. Hence, when the system is installed on a motor vehicle the operator thereof will be apprised by the lamps $67^1$ to $67^5$ inclusive whenever any of the tires drop below the selected operative pressure to be maintained therein. If this is, say thirty pounds, the springs for the plungers 23 will be set to move the diaphragms inward at a pressure reduction below this figure.

The electrical system employed is arranged to indicate which tire becomes under inflated. For example, should the left front tire A lose pressure, the lamp 67¹ for said tire would be lighted and at the same time a sounder 68 (Fig. 4) would be actuated. This occurs automatically, the pressure responsive device on said wheel functioning to close the contacts to produce this result. In like manner, the lamp 67² would be lighted and the sounder 68 would be actuated should the right front tire B lose pressure. This also occurs for the rear tires, the lamps 67³ and 67⁴ being connected with the left rear and the right rear tires C, D respectively. The lamp 67⁵ is connected with the spare tire E.

The signals are operated as follows: When the plunger 23 of a pressure responsive device moves inward to engage its disc 37 with the terminal 42, the lamp in circuit with said terminal is lighted to indicate a drop in pressure. The sounder 68 is also in this circuit. When a tire is over inflated, the contact 41 engages the terminal 42 and the lamp is lighted and the sounder is operated as before. This occurs on filling the tire with air and the over pressure can be released at the fixture 9 to set the device 1—2 for a normal operation. The gauge 35 is not in the circuit at this time. The gauge is only operated when the driver of the vehicle wishes to see whether the tires are up to pressure. This is done by operating a manual switch at each lamp. This switch mechanism, which is the same for each lamp, is detailed in Fig. 4.

As shown in Fig. 4, each lamp is mounted in a tubular casing 69 which is slidably mounted within a housing 70. The sliding supports for the casing 69 are indicated at 71, 71, the rear one being of insulation material. The switch mechanism heretofore referred to is located at the rear end of the housing 70, comprising fixed and movable contacts 72, 73. The former is resilient to normally press the casing 69 forwardly and break the circuit at the rear contact. The contact 72 is connected to the car battery 74 by a wire 75 containing a main switch 76. The contact 73 is connected by a wire 77 to one of the gauge terminals 78. The other terminal 79 of said gauge is connected by a wire 80 with the terminal of the resistance coil 32 through the ring 50 and its brush 56. The lamp casing carries a contact 81 which engages a contact 82 on the lamp housing 70. A wire 83 connects the contact 82 with the wire 75 and with one terminal of the sounder 68. The latter is of the electrically operated type and has its other terminal connected by a wire 84 with the terminal 42 through the ring 49 and its brush 57. A wire 85 connects the wire 84 into the lamp circuit. The grounds are indicated in Fig. 4. The circuit shown in this figure is the same for each lamp and said circuits are in parallel with the circuit shown. The necessary insulation will be provided in the circuits and at the contacts where required.

The letters "L" and "H" on the gauge 35 indicate "low" and "high," respectively. This has reference to the pressure condition within the tires on either side of the selected operative pressure. By this system of calibration, the operator of the vehicle is relieved of the necessity of figuring in pounds of pressure. He is told by the gauge whether the tire is up to pressure or under or over that pressure.

With the projection 14 spaced inwardly from the outer wall of the casing 1, the latter provides a chamber to mount the resistance coil 32 and also has ample bottom surface 15 to clamp the diaphragm in place. The wheel illustrated is of the pressed steel type, this providing considerable space at the hub section for pressure unit 1—2 of our invention.

The signaling system herein described and shown is simple in construction and operation. It is applicable to all motor vehicles of the character referred to either as standard equipment or as an attachment. The lamps 67¹ etc., and the gauge 35 are preferably in one fixture and are mounted within the vehicle body normally on the dash so as to be readily visible to the driver of the car.

We claim as our invention:

1. A pressure responsive device of the character described for actuating an electric signal for an inflatable pneumatic tire, comprising a base member and an outer casing member secured thereto, said base member having a pressure receiving chamber opening towards the outer casing member and connectable with the interior of the tire to be subject to the air pressure therein, a flexible rubber diaphragm clamped between said members and having a tubular portion extending into the outer casing in line with said chamber and providing a continuation thereof, said outer casing having a tubular section embracing the tubular portion of the diaphragm to support the same, the tubular portion of the diaphragm having its end within the tubular section of the outer casing closed by an end wall having an integral connection with the surrounding wall of said tubular portion, a spring biased plunger slidably mounted within the outer casing and pressed inwardly against the end wall of the tubular portion of the diaphragm to force said end wall into said tubular portion towards the chamber on a pressure reduction therein by a doubling over action of the surrounding wall of the tubular portion adjacent to its connection with said end wall, and cooperating electrical contacts carried by the plunger and the outer casing, respectively, for controlling the flow of an electric current through an electrical circuit containing an alarm device in the axial movement of the plunger within the outer casing.

2. A pressure responsive device of the character described for actuating an electric signal for an inflatable pneumatic tire, comprising a base member and an outer casing member secured thereto, said base member having a pressure receiving chamber opening towards said outer casing and connectable with the interior of the tire to be subject to the air pressure therein, a flexible rubber diaphragm having a body portion clamped between said members and provided with oppositely extending tubular portions secured to and on opposite sides of said body portion, one tubular portion extending into said chamber and the other tubular portion extending into the outer casing in line with said chamber and forming a continuation thereof, said outer casing having a tubular section embracing the tubular portion of the diaphragm extending into the outer casing, the tubular portions of the diaphragm being respectively supported by the chamber and the tubular section of the outer casing by having contact therewith, the tubular portion of the diaphragm having its end within the tubular section of the outer casing closed by an end wall having an integral connection with the surrounding wall of said tubular portion, a spring biased plunger slidably mounted within said outer casing and pressed inwardly against the end wall of the tubular portion of the diaphragm to force said end wall into said tubular portion towards the chamber on a pressure reduction therein by a doubling over action of the surrounding wall of the tubular portion adjacent to its connection with said end wall, and cooperating electrical contacts carried by the plunger and the outer casing, respectively, for controlling the flow of an electric current in an electric circuit containing an alarm device in the axial movement of the plunger within the outer casing.

3. A pressure responsive device of the character described for actuating an electric signal for an inflatable pneumatic tire, comprising a base member and an outer casing member secured thereto, said base member having a pressure receiving chamber opening towards said outer casing member and connectable with the interior of the tire to be subject to the air pressure therein, a flexible rubber diaphragm clamped between said members and having a tubular portion extending into the outer casing in line with said chamber and providing a continuation thereof, said outer casing having a tubular section embracing the tubular portion of the diaphragm to support the same, the tubular portion of the diaphragm having its end within the tubular section of the outer casing closed by an end wall having an integral connection with the surrounding wall of said tubular portion, a spring biased plunger slidably mounted within the outer casing and pressed inwardly against the end wall of the tubular portion of the diaphragm to force said end wall into said tubular portion towards the chamber on a pressure reduction therein by a rolling over action of the surrounding wall of the tubular portion adjacent to its connection with said end wall, a plate element carried by the plunger within the outer casing in spaced relation to the diaphragm and having a slidable, but non-rotative connection with the outer casing, and cooperating electrical contacts carried by said plate element and the outer casing, respectively, to open and close a circuit therethrough containing a signal device in the axial movement of the plunger within the casing.

4. A pressure responsive device of the character described for actuating an electric signal for an inflatable pneumatic tire, comprising a base member and an outer casing member secured thereto, said base member having a pressure receiving chamber opening towards said outer casing member and connectable with the interior of the tire to be subject to the air pressure therein, a flexible rubber diaphragm clamped between said members and having a tubular portion extending into the outer casing in line with said chamber and providing a continuation thereof, said outer casing having a tubular section embracing the tubular portion of the diaphragm to support the same, the tubular portion of the diaphragm having its end within the tubular section of the outer casing closed by an end wall having an integral connection with the surrounding wall of the tubular portion, a spring biased plunger slidably mounted within the outer casing and pressed inwardly against the end wall of the tubular portion of the diaphragm to force said end wall into said tubular portion towards the chamber on a pressure reduction therein by a doubling over action of the surrounding wall of the tubular portion adjacent to its connection with said end wall, a fixed electrical contact carried by the outer casing at a point intermediate the limits of sliding movement of the plunger, and electrical contact elements carried by the plunger on opposite sides of said fixed contact and movable by the plunger into and out of engagement therewith to close a circuit therethrough at either limit of the sliding movement of the plunger.

5. A pressure responsive device of the character described for actuating an electric signal for an inflatable pneumatic tire, comprising a base member and an outer casing member secured thereto, said base member having a pressure receiving chamber opening towards said outer casing member and connectable with the interior of the tire to be subject to the air pressure therein, a flexible rubber diaphragm clamped between said members and having a tubular portion extending into the outer casing in line with said chamber and providing a continuation thereof, said outer casing having a tubular section embracing the tubular portion of the diaphragm to support the same, the tubular portion of the diaphragm having its end within the tubular section of the outer casing closed by an end wall having an integral connection with the surrounding wall of said tubular portion, a spring biased plunger slidably mounted within the outer casing and pressed inwardly against the end wall of the tubular portion of the diaphragm to force said end wall into said tubular portion towards the chamber on a pressure reduction therein by a folding over action of the surrounding wall of the tubular portion adjacent to its connection with said end wall, a spool of insulating material carried by the plunger within the outer casing and movable therewith, an electrical resistance coil carried by said spool, and an electrical contact element slidably engaging said coil to control the flow of an electric current therethrough in a circuit containing the coil and a signal device in the axial movement of the plunger within the outer casing, said spool being recessed to receive the tubular section of the outer casing in the movement of the spool towards the same.

ROY ADDY.
HENRY E. ADDY.